Jan. 8, 1963   R. D. FRYE   3,071,894
PERCUSSION NOISE MAKER
Filed Sept. 26, 1960
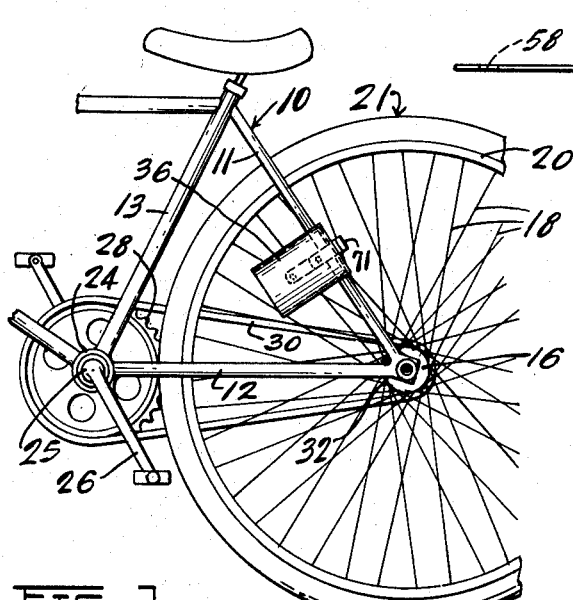
FIG-1-
FIG-4-
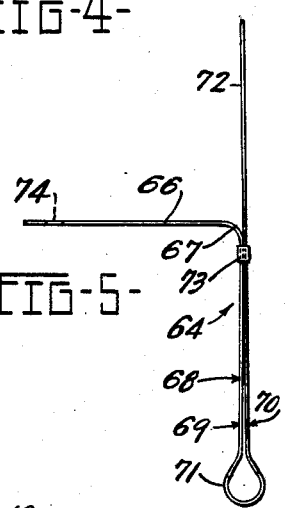
FIG-5-
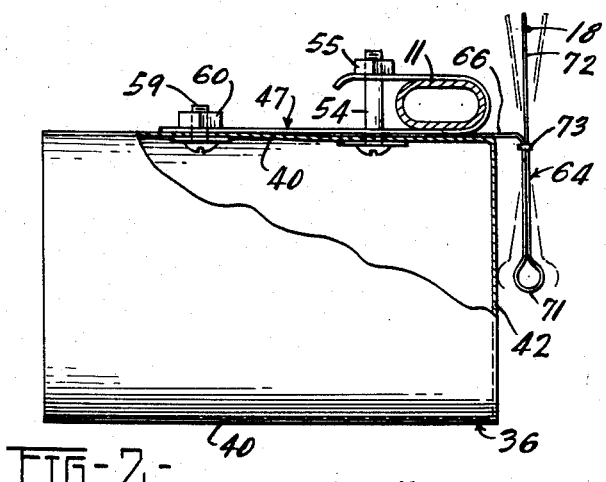
FIG-2-
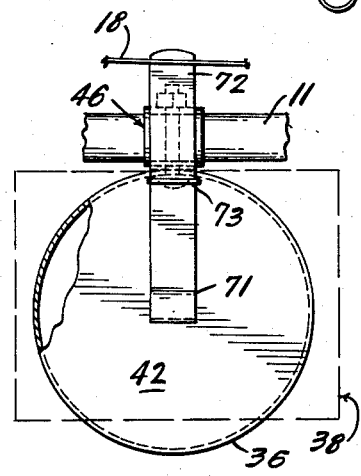
FIG-3-
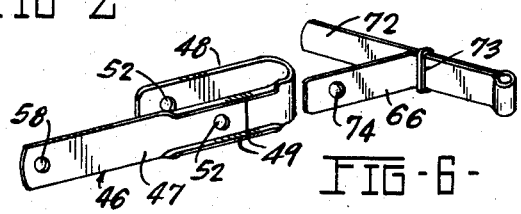
FIG-6-
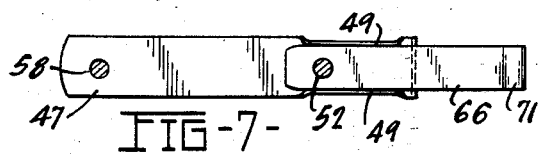
FIG-7-
INVENTOR:
Richard D. Frye.
BY
Harry O. Ernsberger,
Atty.

United States Patent Office 3,071,894
Patented Jan. 8, 1963

3,071,894
PERCUSSION NOISE MAKER
Richard D. Frye, 9711 Elm Drive, Erie, Mich.
Filed Sept. 26, 1960, Ser. No. 58,336
1 Claim. (Cl. 46—175)

This invention relates to noise making devices and more especially to a percussion noise maker for use with spoked wheels of vehicles such as bicycles, tricycles, and the like.

Noise making devices for use with bicycles have been used wherein a strip of plastic or metal projects into the path of movement of the wheel spokes, and, as the wheel rotates, the individual spokes successively engage the strip and flex it. As the individual spokes move successively out of engagement with the strip the flexed strip reacts and impinges against the next succeeding spoke, resulting in sounds of metallic sharpness. The frequency of the vibrations or flexures of the strip increases with the speed of the wheel, and the pitch of the successive sounds is proportionately higher in tone. While such devices set up noises which are attractive to youngsters, the sounds produced lack resonance or deep tone rumble such as the sound of an unmuffled exhaust gas stream from a vehicle engine.

The present invention embraces the provision of a percussion means usable with a vehicle having spoked wheels wherein a clapper or striking member of the percussion device is actuated by successive engagement of the spokes whereby a series of deep tone rumbling sounds are developed by the percussion means simulating the unmuffled exhaust from a vehicle engine.

Another object of the invention is the provision of a percussion noise maker for use with spoked, wheeled vehicles such as bicycles, tricycles or the like wherein an inexpensive percussion means is successively engaged or impinged by a hammer or clapper vibrated by successive engagement with the spokes of the wheel to actuate a diaphragm or membrane arranged to act upon an air column and produce deep toned rumbling noises or sounds.

Another object of the invention resides in the provision of a noise making device in the form of an inexpensive accessory that may be attached to a bicycle, tricycle or the like embodying a percussion member fashioned of inexpensive material whereby a noise maker of extremely simple design may be economically manufactured and affixed to a spoked vehicle without the use of special tools.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view illustrating a portion of a conventional bicycle showing a form of noise maker of the invention installed on the bicycle;

FIGURE 2 is a sectional view illustrating the noise making instrumentality and means of attaching same to a bicycle;

FIGURE 3 is an end elevational view of the arrangement shown in FIGURE 2;

FIGURE 4 is a top plan view of a clamp means for attaching the noise making instrumentality to a bicycle frame;

FIGURE 5 is a plan view of a clapper member forming a component of the construction;

FIGURE 6 is an isometric view of the clamp means and clapper member in disassembled relation, and FIGURE 7 is an elevational view of the clamp and clapper member in assembled relation.

While a preferred form of the invention is illustrated with a bicycle of conventional construction, it is to be understood that the noise making instrumentality may be employed to advantage with any radially spoked rotating member whereby production of sound waves of the character established by vibrating a diaphragm is desired.

Referring to the drawings in detail, the portion of the bicycle illustrated is inclusive of a frame 10 fashioned of tubular members indicated at 11, 12 and 13, the junction of the tubular frame members 11 and 12 being formed with means journally supporting a hub structure 16 to which the inner ends of radially extending spokes 18 are attached, the outer ends of the spokes being connected to a rim 20 of the rear bicycle wheel 21.

The region of convergence of the tubular members 12 and 13 of the bicycle construction are attached or welded to a tubular portion 24 which journally supports the hub portion 25 of a pedal-crank construction 26, a driving sprocket 28 being secured to the hub portion 25. A driving chain 30 connects the driving sprocket 28 with a driven sprocket 32 associated with the hub 16. By rotating the pedal-crank construction 26 by foot pressure in a conventional manner, the bicycle wheel 21 is rotated.

The noise making instrumentality of the invention employs or includes a percussion member 36 which may be of circular cylindrical cross-section as shown in FIGURE 3 or may be of rectangular cross-section as indicated by the broken lines at 38 in FIGURE 3. The percussion member 36 is formed with a circular wall 40 and a bottom wall 42, the opposite end of member 36 being open or closed. The member 36, being tubular, provides an air column vibrated in a manner hereinafter described.

The percussion member 36 may be fashioned of any suitable material, as for example, cardboard, paper-board, resinous plastic material, metal, or other suitable thin walled material. The member 36 may be fashioned of composite materials, for example, the wall portion 40 may be fashioned of cardboard, paper-board, resinous plastic material, and the bottom wall or percussion portion 42 may be formed of metal or other material dissimilar of that of portion 40 and the two components secured together by well-known conventional means.

A paper-board container or package of the character in which dry cereals are marketed may be advantageously employed as the percussion member. Any suitable substantially rigid, generally tubular member having an open end and a closed end, wherein the closed end is of material capable of being vibrated by percussion, may be used to advantage. The bottom wall 42 provides a diaphragm or membrane which may be vibrated by percussion or striking the same by suitable means.

A simple, yet effective, clamp means is provided for securing the percussion member 36 to the tubular member 11 of the bicycle frame and the clapper member in proper position. A preferred form of clamp means is particularly illustrated in FIGURES 2, 4, 6 and 7. The clamp means 46 is formed of a single piece of sheet metal and bent to form parallel leg portions 47 and 48 which are integrally joined by a bight portion 50, as shown in FIGURE 4. The leg portion 47 is of greater length than the leg portion 48.

The leg portions 47 and 48 are provided respectively with openings 52 which are adapted to receive a clamping bolt 54 and a securing nut 55 for holding the clamp in assembled position on the bicycle frame member 11, as shown in FIGURE 2. The leg 47 of the clamp 46 is provided with an additional opening 58 at its outer end to accommodate a screw 59 and a clamping nut 60. The clamping bolts 54 and 59 extend through openings formed in the wall 40 of the percussion member 36 to secure proper alignment of the percussion member with the leg portion 47 of the clamp.

A member, hammer or clapper is provided adapted to be actuated or vibrated by the spokes 18 of the vehicle wheel 21 to impinge the percussion portion, diaphragm or membrane 42 of the member 36. In the embodiment illustrated, the clapper 64, shown particularly in FIGURES 2, 5 and 6 is fashioned of a single piece of sheet metal such as spring steel in order to provide substantial resiliency for flexure of the clapper.

The clapper or hammer 64 comprises a strip of spring steel or other suitable material fashioned to a configuration of substantially T-shape comprising a stem portion 66, a hammer portion 68 of double thickness of the strip, provided by contiguous portions 69 and 70 being formed by bending the strip upon itself as shown in FIGURE 5, providing a striker portion 71.

The portion 70 of the strip is elongated to form a tongue 72 adapted to extend into the path of movement of the spokes 18 of the wheel 21, as particularly shown in FIGURES 2 and 3. The contiguous portions 69 and 70 of the clapper member are secured against dislodgment by a metal strap embracing the portions as shown in FIGURES 2, 3, 5 and 6.

The clapper member 64 is adapted to be secured to the clamp 47 by means of the stem 66, the latter being provided with an opening 74 shown in FIGURE 6.

A portion of the leg 47 of the clamp 46 is fashioned with outwardly turned flanges 49, which are spaced to snugly accommodate the stem 66 of the clapper member 64, as shown in FIGURE 7. As particularly shown in FIGURE 2, the stem 66 of the clapper is disposed between the leg portion 47 of the clamp adjacent to the flange 49 and the cylindrical wall 40 of the percussion member 36.

The assembly of the components of the noise making instrumentality with a bicycle frame and spoked wheel and the operation thereof is as follows: The legs of the clamp member 46 are placed astraddle the frame member 11 of the bicycle, the stem 66 of the clapper between the flanges 49, and the wall 40 of the percussion member 36 contiguous with the clapper and leg 47 of the clamp. The bolt 54 is inserted through registering openings formed in the wall 40 of the percussion member, the opening 74 in the stem 66 of the clapper and the openings 52 in the legs of the clamp 46.

The nut 55 is applied to the bolt 54 and is loosely drawn up. The assembly may then be adjusted along the bicycle frame member 11 to a position whereby the spokes 18 will engage the end region of the clapper portion 72, such position being illustrated in FIGURES 2 and 3. When the proper adjustment has been made lengthwise of the bicycle frame member 11, the nut 55 may be tightly drawn to hold the assembly in such position.

The bolt 59 is inserted through the opening 58 in the leg 47 of the clamp and through a registering opening in the wall 40 of the percussion member 36 to maintain the clamp and the percussion member in proper aligned relation. The flanges 49, formed laterally from the leg 47 of the clamp member, maintain the clapper in proper position with respect to the clamp and the wall or diaphragm 42.

During rotation of the spoked wheel 21, the spokes 18 successively engage and vibrate the portions 69 and 72 about the bend 67 of the stem 66 as a flexing point or fulcrum. The clapper member is actuated or vibrated by the spokes and the striker portion 71 successively and rapidly impinged against the bottom wall, membrane or diaphragm 42 of the percussion member 36, which vibrates the air column within the tubular member 36 or the air ambient the membrane or vibrating wall 42. The vibrations of the membrane or bottom wall 42, acting on the ambient air or the air column sets up or creates sound waves of a character providing an audible rumbling or noise which simulates the unmuffled exhaust gas stream of the internal combustion engine of a vehicle.

The percussion or tubular member 36 is preferably a paper-board container in which dry cereals or similar dry comminuted materials are packaged and such containers, other wise discarded as waste, are employed to advantage as a simple yet effective percussion member for the purposes herein mentioned. A container or member 36 of circular cross-section as shown in FIGURE 3, or a similar cardboard, paper-board or plastic container of rectangular cross-section shown in broken lines at 38 in FIGURE 3, may be advantageously employed where the same is provided with a bottom wall providing a diaphragm or membrane adapted to be vibrated by the clapper.

It is to be understood that the member 36 may be only partially tubular, or a portion thereof cut away and still be capable of producing noise through vibration of the air adjacent the wall 42.

It is apparent that, within the scope of the invention, modifications and different arrangements may be made other than as herein disclosed, and the present disclosure is illustrative merely, the invention comprehending all variations thereof.

I claim:

A noise making instrumentality for attachment to the frame of a vehicle having a spoked wheel including, in combination, a hollow cylindrically-shaped percussion member having an end wall providing a diaphragm, a generally U-shaped clamp, means engageable with one leg of the clamp and a wall region of the percussion member to secure the percussion member to the clamp, a generally T-shaped clapper element, the stem portion of the element adapted to be disposed between the cylindrical wall region of the percussion member and the clamp, flange means formed on a leg of the clamp engaging the stem for maintaining the stem in aligned relation with said leg of the clamp, securing means adapted to extend through openings in the cylindrical wall of the percussion member, the stem and the clamp for securing the percussion member, the stem and the clamp to the frame of the vehicle, said clapper element being formed of flexible spring steel, one arm of the T-shaped element forming a clapper portion and the other arm providing a projection arranged to extend into the path of the spokes of the wheel, the clapper portion being disposed adjacent the diaphragm, said projection and clapper portion being adapted to be oscillated by successive engagement of the spokes with the projection whereby the clapper portion is successively impinged against the end wall to vibrate the air in the cylindrically-shaped percussion member to produce audible sounds.

References Cited in the file of this patent

UNITED STATES PATENTS

| | | |
|---|---|---|
| 2,624,156 | Meyer | Jan. 6, 1953 |
| 2,667,720 | Connell | Feb. 2, 1954 |
| 2,719,385 | Wilson | Oct. 4, 1955 |
| 2,914,886 | Barthel | Dec. 1, 1959 |